United States Patent [19]

Sanders et al.

[11] Patent Number: 5,212,935
[45] Date of Patent: May 25, 1993

[54] DEVICE FOR HARVESTING CORN OR OTHER GRAINS

[75] Inventors: Lambert Sanders, Herzebrock-Clarholz; Heinrich Ostrup; Heribert Dudler, both of Hersewinkel, all of Fed. Rep. of Germany

[73] Assignee: Claas oHG, Harsewinkel, Fed. Rep. of Germany

[21] Appl. No.: 812,273

[22] Filed: Dec. 23, 1991

[30] Foreign Application Priority Data

Dec. 22, 1990 [DE] Fed. Rep. of Germany ....... 4041530

[51] Int. Cl.$^5$ ............................................. A01D 45/02
[52] U.S. Cl. ........................................ 56/66; 56/103; 56/106
[58] Field of Search ................ 56/53, 59, 66, 69, 75, 56/82, 88, 93, 94, 98, 99, 100, 101, 102, 103, 106, 109, 111, 119

[56] References Cited

U.S. PATENT DOCUMENTS

| | | | |
|---|---|---|---|
| 1,936,760 | 11/1933 | Hitchcock | 56/103 |
| 2,360,131 | 10/1944 | Hitchcock | 56/103 |
| 2,947,131 | 8/1960 | Karlsson | 56/103 X |
| 4,553,379 | 11/1985 | Kalverkamp | 56/98 X |
| 4,961,305 | 10/1990 | Ostrup et al. | 56/98 |
| 4,974,402 | 12/1990 | Ostrup et al. | 56/102 |

FOREIGN PATENT DOCUMENTS

| | | |
|---|---|---|
| 3610141 | 10/1967 | Fed. Rep. of Germany .......... 56/53 |
| 3433444A1 | 3/1986 | Fed. Rep. of Germany . |
| 3930777A1 | 7/1990 | Fed. Rep. of Germany . |

Primary Examiner—George A. Suchfield
Attorney, Agent, or Firm—Browdy and Neimark

[57] ABSTRACT

The harvesting device for harvesting corn or other grains is embodied as an attachment for a combine and provided with a draw-in device (3) and one picking gap for separating the cobs from the plants (stalks). Furthermore, the harvesting device has one driven picking roller (4) with beater plates per row, as well as a cheek-like guide plate associated with this picking roller (4) and partially enshrouding it, or alternatively, a bracing support extending paraxially to the picking roller and embodied as a driven counter-roller (5). A connection piece (20) acting as a separating and comminuting cutter and stabilizing the distance between the picking roller (4) and the bracing support (5) is disposed in the plant intake (PE) between the picking roller (4) and bracing support (5). This connection piece (20) extends crosswise, preferably at right angles to the plant intake (A) and thus to the longitudinal axis of the picking roller (4) and is formed by a sheet metal plate with an upper cutter edge (21) extending at least almost vertically in respect to the longitudinal axis of the picking roller.

13 Claims, 5 Drawing Sheets

IV-IV

V-V

DEVICE FOR HARVESTING CORN OR OTHER GRAINS

BACKGROUND OF THE INVENTION

The invention relates to a device for harvesting corn or other grains. The device is generally utilized as an attachment to a combine and is provided with a draw-in device and one picking gap per plant row for separating the cob from the plant and having one driven picking roller per plant row with beater plates. The device can be alternatively provided with a cheek-like guide plate associated with the picking roller which partially enshrouds the roller or with a bracing support extending paraxially to the picking roller and embodied as a driven counter-roller.

A harvesting device of this type is shown, for example, in German Published, Non-Examined Patent Application DE-OS 39 30 77 and German Published, Non-Examined Patent Application DE-OS 34 33 444.

In the devices shown in these publications, the picking roller and the bracing support are each seated on their own supports and these supports are connected only by one longitudinal end with the corn picking frame or the drive box. This results in devices where the supports for the picking roller and the bracing support are only hingedly seated at one end and their other end is open for forming the inlet for the plants.

Because lateral forces act on the two supports when the plants or foreign bodies enter, it is important that they be fixed at their ends in a comparatively stable and heavily reinforced manner. Thus, in operation the main load impacts on the front inlet section of the supports resulting in a widening of the picking gap. This impact results in a lateral movement of the supports, which leads to interruptions of the working process and damage to the seating and supporting points.

SUMMARY OF THE INVENTION

It is the object of the invention to provide a harvesting device which eliminates the problem of prior art devices. This is accomplished by the invention by providing a simple and inexpensively constructed and easily mounted device for assuring the distance between the picking roller supports and thereby, the picking roller and the bracing support in respect to each other. This prevents excessive widening in the plant intake area, permits a lighter construction of the supports and makes damage in the bearing and fastening places impossible, while simultaneously permitting the separating process of the corn parts.

This object is attained by the novel features recited below which represent advantageous and practical improvements in the attainment of the object.

In accordance with the invention the harvesting device is provided with a cross connection (lateral stabilization) between its two supports and thus between the picking roller and the bracing support. This prevents excessive widening of the picking gap and thus the outward deformation of the two supports by the corn plants or foreign bodies. This makes damage to and destruction in the bearing and fastening places of the supports, the picking roller and the bracing support impossible.

This cross connection permits a lighter construction of the lateral supports while increasing their stability by means of the connections at both ends. This occurs because the moment of resistance of the supports is reduced and deformation of the supports due to foreign bodies is greatly reduced.

In the preferred form of the invention the cross connection is achieved by means of a plate-shaped connection piece, which is rigidly held by one end on one support and by the other end in a spring-loaded manner on the other support. The spring loading is provided to permit a limited area of widening of the supports. In this embodiment it is advantageous to dispose an electrical switch in the spring-loaded area which, in case of extreme widening of the supports by the action of a foreign body, gives off a visual or acoustical signal warning or which switches off the respective drives of the harvesting device.

This cross connection can simultaneously embody a cutting and grinding device can cut off cornstalks near the ground and grind them in the intake area.

This cross connection element with a cutter edge can be employed in single as well as dual roller systems and also in a corn picker with a picking roller and a cheek-like guide plate. In the dual roller system the cross connection element can be inserted into the cutouts of the picking roller and counter roller and also disposed at the roller tips with worm threads, while in both positions maintaining lateral stability and the cutting action.

Further, the cross connection element can be disposed in an easily adjustable manner in a selected position and can also be installed in harvesting devices during operation.

It is intended that the cross connection element can also be embodied from an arbitrarily heavy sheet metal plate with a ground-on and integral cutting edge or with a replaceable cutter.

An exemplary embodiment in accordance with the invention is shown in the drawings and will be described in detail below.

DESCRIPTION OF PREFERRED EMBODIMENTS

Figure 1:
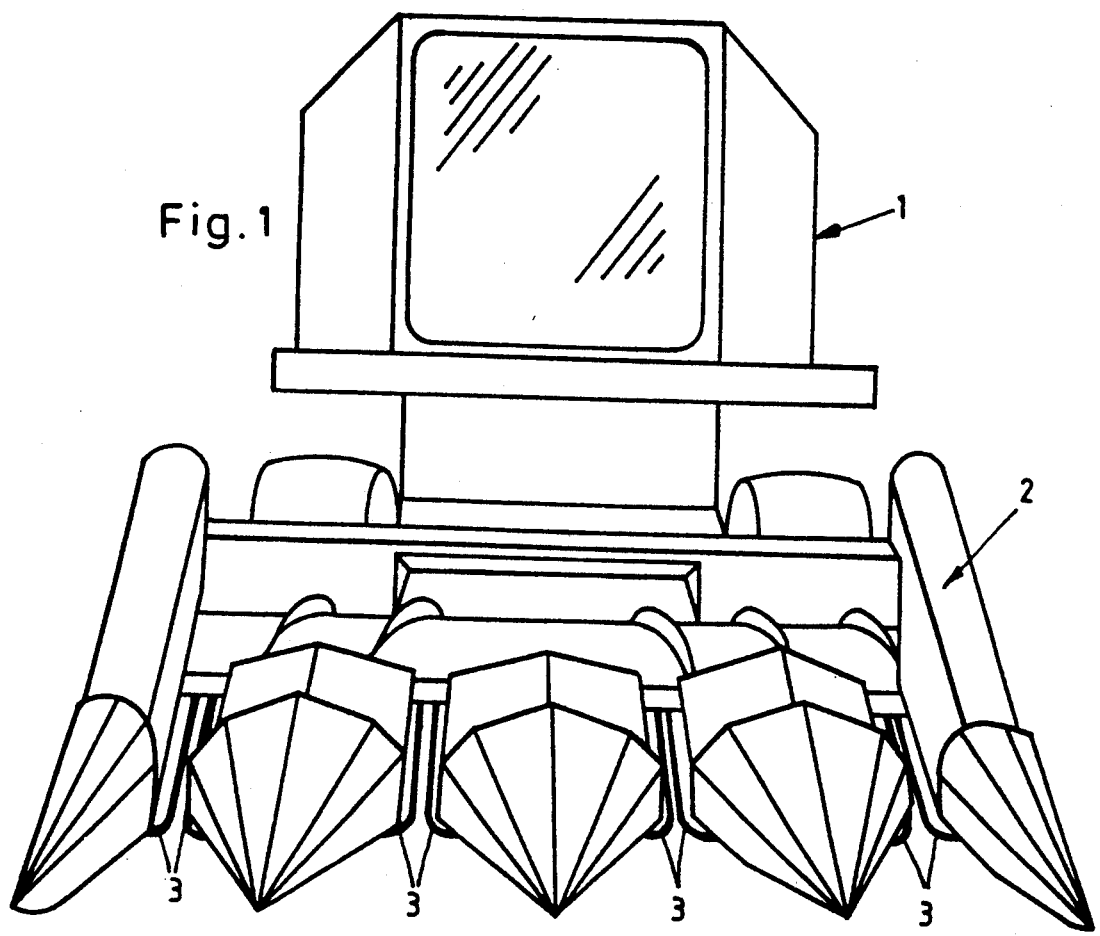
FIG. 1 is a front view of a harvesting device with a corn picker.

A combine with a corn picker (2) disposed at the front is designated by (1). This corn picker (2) has four rows each having a pair of conveyor chains (3), which draw in the cornstalks, not shown. Below each pair of conveyor chains (3) a picking roller (4) and a bracing support, formed by a counter roller (5) or a cheek-like guide plate (6) (see FIG. 6) partially enclosing the picking roller (4), are seated paraxially to each other.

The picking roller (4) and the counter roller (5) are each seated in supports (7), which are fixed at their rear longitudinal ends, seen in the direction of the plants, on a common drive box (8) and are open at their longitudinal end towards the plant intake.

The two rollers (4, 5) are driven in opposite directions from the drive box (8).

Figure 6:
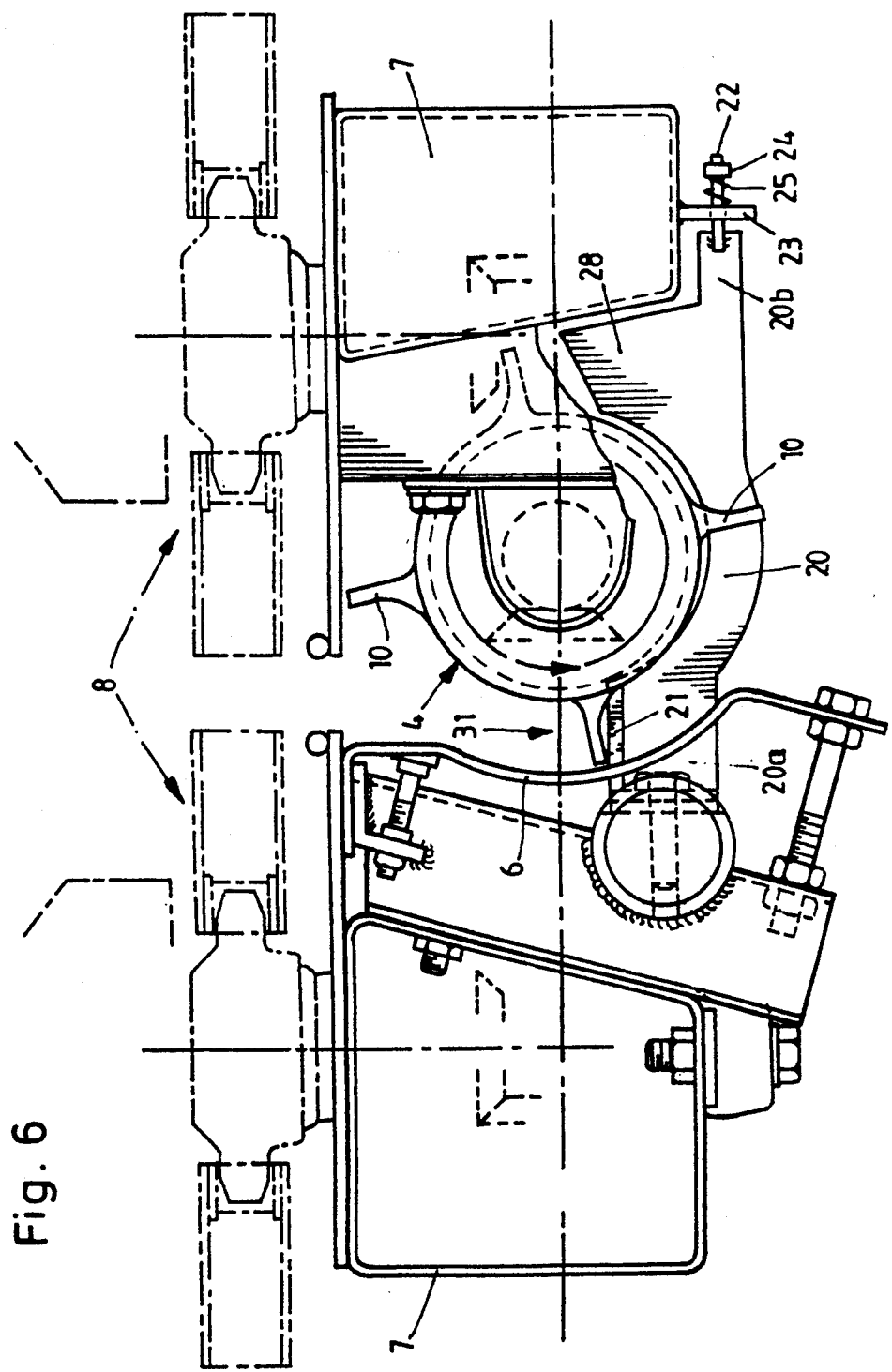
FIG. 6 is a front view of a picking roller and of a cheek-like guide plate cooperating with it with an associated connection piece.

In the embodiment of the corn picker (2) with a picking roller (4) and guide plates (6), as shown in FIG. 6, the picking roller (4) is also drivingly seated on a support (7) and the guide plate (6) is fixed on the other support (7).

In a known manner, the picking roller (4) consists of a cylindrical basic body (9), which has beater plates (10) evenly distributed on its circumference. The picking roller (4) is provided with cutouts (11) into which the cutters (12) of a cutter assembly extend. The counter roller (5) is disposed above the cutter assembly (12). Counter roller (5) also consists of a cylindrical basic body (13), on which has been placed in the axial direction at least three-bladed, preferably six-bladed segments (15) at spaces (14) in an axial direction from each other. The wings (15a) of these segments (15) are curved and are backwardly inclined opposite the direction of rotation indicated by the arrow "B". This causes the plant stalks to be pushed in the direction of the picking roller (4).

Figure 3:
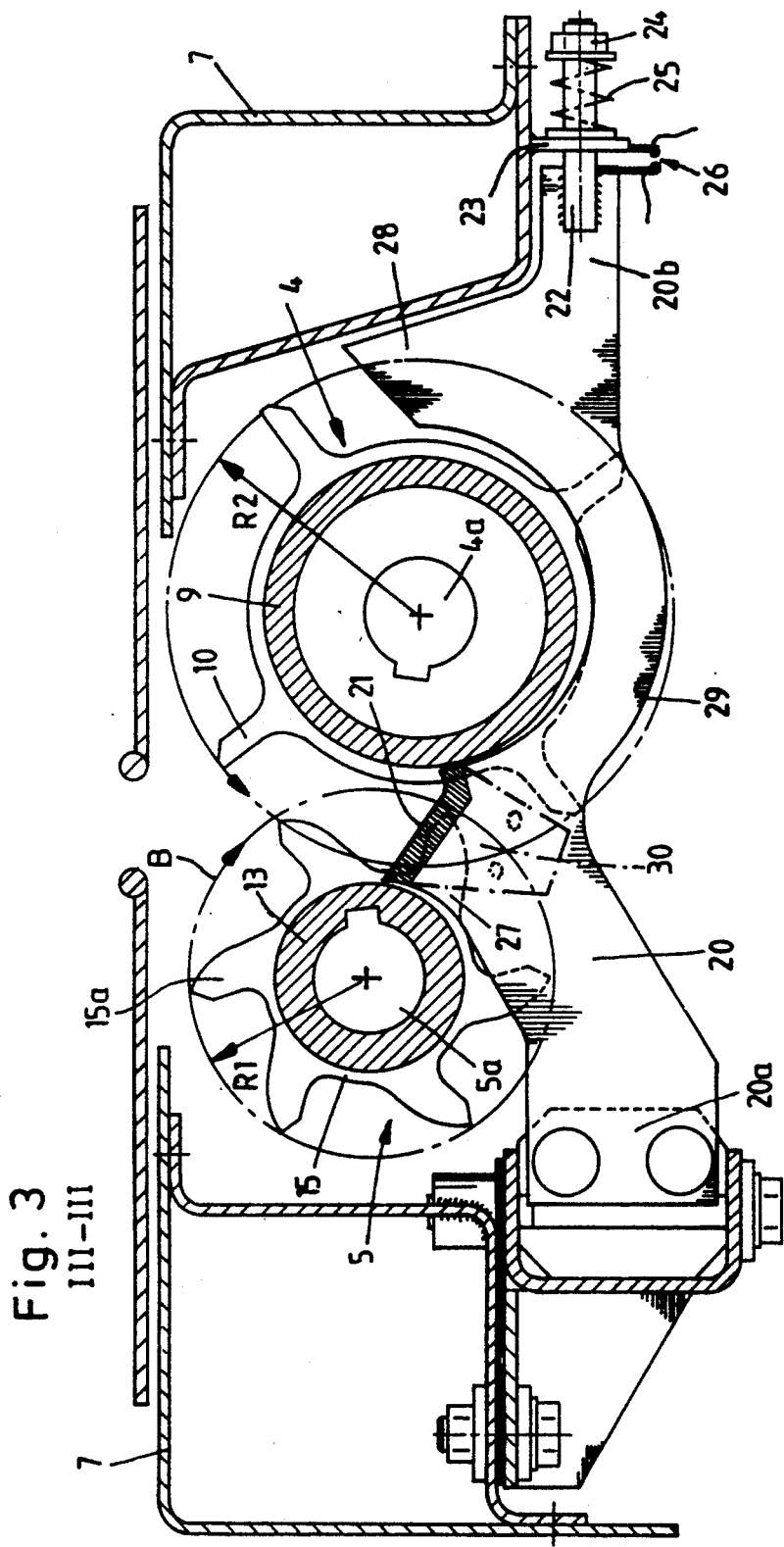
FIG. 3 is a cross sectional view of the picking roller and counter roller in a first position along section line III—III in FIG. 2 with the connection piece disposed between the roller supports and extending into cutouts of the picking roller and the counter roller.

As can be seen from FIG. 3, the distance of the roller shafts (4a) and (5a) from each other is less than the sum of the envelope radii R1 and R2, so that the assured pull-through of the stalks takes place under any circumstances because of the continuous positive connection between the rollers (4, 5) and the crop.

Figure 2:
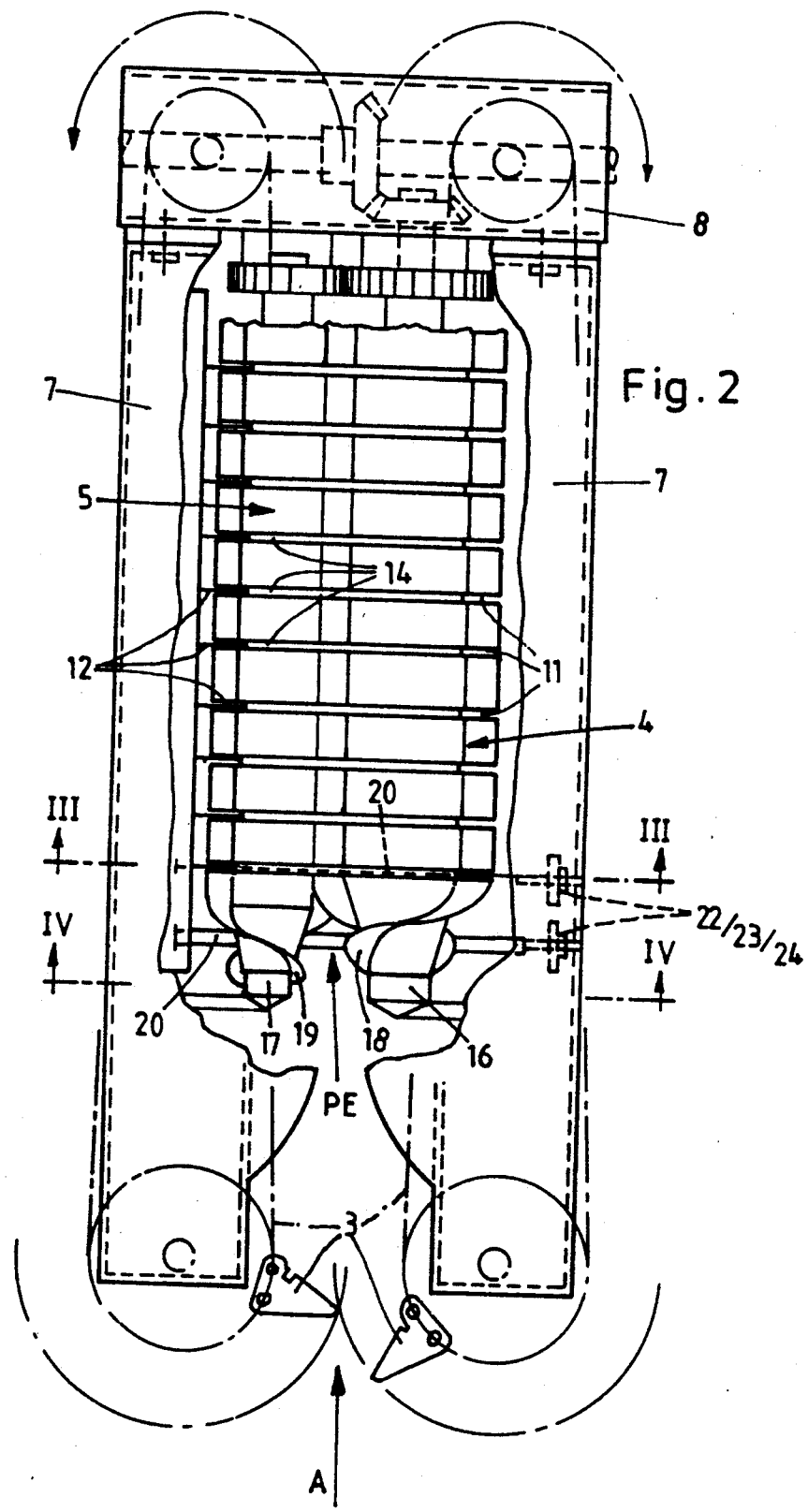
FIG. 2 is a top view of the corn picker with a picking roller and associated counter roller and a connection piece in the form of a cutter and spacer shown in two possible positions of disposition in the intake area for the plants.

FIG. 2 and also 4 and 5 show that the rollers (4) and (5) have conical points (16) or (17) in the front, which are equipped with worm plates (18) and (19) (a worm thread), which is intended to improve the intake or the stalk reception.

A connection piece (20) acting as a cutter and to stabilize the distance between the picking roller (4) and the bracing support (5, 6) is disposed in the plant intake (PE) between the picking roller (4) and bracing support (5, 6).

This connection piece (20) extends laterally, preferably at right angles to the plant intake "A" and perpendicular to the longitudinal axis of the picking roller (4). The connection piece (20) can be made from a sheet metal plate with an upper cutter edge (21) extending almost vertically in respect to the longitudinal axis of the picking roller.

Figure 4:
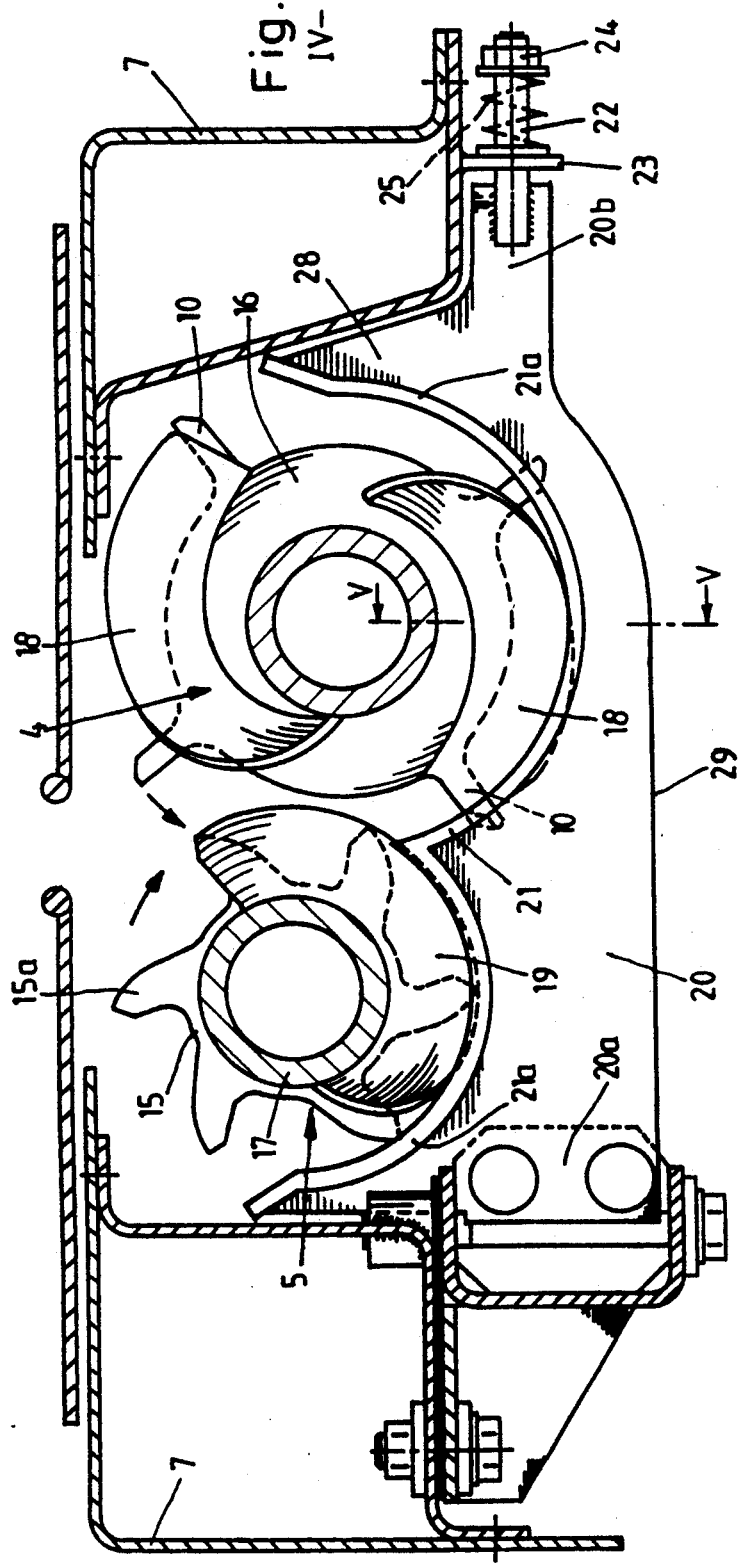
FIG. 4 is a cross sectional view of the picking roller and counter roller in a second position along section line IV—IV in FIG. 2 with the connection piece disposed in the area of the intake worms of the two rollers.

In accordance with the embodiment along section IV—IV of FIGS. 2 and 4, the connection piece (20) corresponds to the worm thread (18, 19) which is attached to the picking roller (4) and the counter roller (5) in the plant intake (PE).

In accordance with the embodiment along section III—III of FIGS. 2 and 3, the connection piece (20) is disposed behind the worm thread (18, 19) attached in the plant intake (PE) on the picking roller (4) and the counter roller (5) and extends into a cutout (11) of the picking roller (4) and a space (14) of the counter roller (5).

In both of the above embodiments, one longitudinal end (20a) of the connection piece (20) is fastened rigidly but removably and the other longitudinal end (20b) in a spring-loaded manner on the two supports (7) bearing the picking roller (4) and the bracing support (5, 6).

In this connection it is preferred to fasten the connection piece (20) with its longitudinal end (20a) rigidly on the support (7) bearing the counter roller (5) or the guide plate (6), and with its other longitudinal end (20b) on the support (7) bearing the picking roller (4) in a defined longitudinal displacement range during change of the distance between the two supports (7).

The movably seated longitudinal end (20b) of the connection piece (20) has a bolt (22) fixed on it, which extends through a bracket (23) fastened on the support (7); a pressure spring (25) is disposed around the bolt (22), which is supported on the bracket (23) and on a nut (24) placed on the bolt (22). This allows adjustment of the tolerance when the distance between the picking roller (4) and the bracing support (5, 6) is changed.

It is furthermore preferred to dispose, between the bracket (23) and the longitudinal end (20b) of the connection piece, an electrical switch (26), such as a proximity switch, toggle switch, expanding switch, or the like, as shown in FIG. 3, which switches off the drive of the picking roller (4) and the counter roller (5) and/or the drive of the combine in case of an extreme change in the distance between the picking roller (4) and the bracing support (5, 6) as well as in case of a displacement, which exceeds the tolerance range, of the connection piece (20) by the action of foreign bodies. It is also possible for this switch (26) to transmit an acoustic or visual signal to the operator of the combine regarding the extreme change in distance, so that the operator shuts off the respective drives.

The plate-shaped connection piece (20) encloses the picking roller (4) over a portion of the area of its circumference and has, between the picking roller (4) and the counter roller (5), an upwardly extending plate section (27) with a cutter edge (21), and between the picking roller (4) and the support (7) an upwardly extending plate section (28) as a protection against jamming of pieces of chaff, so that corn straw cannot become jammed between the picking roller (4) and the support (7).

The lower edge (29) of the connection piece (20) lies in the area of the picking roller (4) within its envelope radius (R2), and the connection piece (20) extends downwardly in the area of the bracing support (5, 6) (FIG. 3).

The connection piece (20) can be equipped with an replaceable cutter blade (30) as the cutter edge at the upwardly extending plate section (27) between the picking roller (5) and the bracing support (5, 6) (see the dash-dotted illustration in FIG. 3).

The embodiment of connection piece (20), extending into the cutout (11) and the space (14) between both rollers (4, 5), is shown in FIG. 3, which has the cutter edge (21) on the upwardly extending plate section (27), between the two rollers (4, 5), which is formed on or formed by a replaceable cutter blade (30). The plate section (28) upwardly extending between the picking roller (4) and the support (7) as a protection against jamming can also be clearly seen in this FIG. 3, and the other downwardly extending longitudinal end (20a), which is rigidly fixed on the support (7) below the counter roller (5), is visible.

FIG. 4 shows the disposition of the embodiment of the connection piece (20) below the worm threads (18, 19) on the two rollers (4, 5), where the connection piece (20) has an edge (21a) over its entire top extension between the supports (7), which has been formed out in a direction counter to the plant intake (PE). This edge (21a) encloses both rollers (4, 5) in a curved shape over a portion of the circumference and forms, in the area of the picking roller (4) between the rollers (4, 5), the cutter edge which, together with the worm gear (18), performs—in the area "S"—a cutting operation (chopping up the plant stalks).

The upwardly extending jam protection (28) is also provided on this plate-shaped connection piece (20) at the end (20b), and the lower edge of the plate (29) extends at a distance below the picking roller (4) and the counter roller (5) in a horizontal direction from the picking roller (4) towards the longitudinal end (20a).

A cutting blade or an abrading bar can be exchangeably fastened on the worm gear (18) in the cutting area "S", so that the worm gear (18) provides continuous, lasting use because of the replaceable parts.

Figure 5:
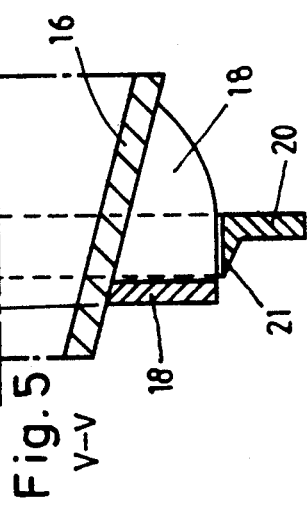
FIG. 5 is a cross sectional view of the worm area of a roller on the intake side with the connection piece and integrated cutter hood along section line V—V of FIG. 4.

The assignment of the connection piece (20) to the worm gear (18) of the picking roller tip (cone) (16) can be clearly seen in FIG. 5, and the cutter edge (21) of the connection piece (20) cooperates with the worm gear (18) in the cutting area "S". In the cutting area "S" the worm gear (18) is shaped in such a way that it can turn uniformly past the cutter edge (21) in the entire rotation area along the connection piece (20).

FIG. 6 shows a picking roller (4) seated on a support (7) and a guide plate (6) fastened on the other support to form the bracing support. In this case the connection piece (20) is rigidly fixed on the support (7) holding the guide plate (6) by means of its end (20a), and is seated in a spring-loaded manner with its other end (20b) on the support (7) on the side of the picking roller.

The connection piece (20) extends into the cutout (11) of the picking roller (4) and surrounds it over a portion of the circle from the upwardly extending jam protector (28) to the cutter edge (21), which extends between the guide plate (6) and the picking roller (4) approximately horizontally in the gap (31)—cutting channel (31)—and is formed by a cutting edge which is ground on and integrated, or by a replaceable cutting blade (30) as similar to that shown in FIG. 3.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

We claim:

1. A harvesting device for harvesting corn or other grains embodied as an attachment for a combine and provided with a draw-in device and one picking gap per plant row for separating the cob from a cornstalk and having one driven picking roller per plant row with beater plates, and a bracing support (5, 6) extending paraxially to said picking roller, said device comprising, a connection piece (20) means disposed in a plant intake (PE) between said picking roller (4) and said bracing support (5, 6) for separating and cominnuting said cornstalk and stabilizing a distance between said picking roller (4) and said bracing support (5, 6), said connection piece (20) means extending crosswise, at right angles to said plant intake (A) and perpendicular to a longitudinal axis of said picking roller (4) and is formed by a sheet metal plate with an upper cutter edge (21) extending almost vertically in respect to said longitudinal axis of said picking roller wherein a first longitudinal end (20a) of said connection piece (20) means is fastened rigidly but removably and a second longitudinal end (20b) is fastened in a spring-loaded manner on two supports (7) respectively bearing said picking roller (4) and said bracing support (5, 6).

2. A harvesting device in accordance with claim 1, wherein said connection piece (20) means is fastened at said first longitudinally end (20a) rigidly on a first of said two supports, bearing said bracing support, and at said second longitudinal end (20b) on a second of said two supports, bearing said picking roller (4) in a defined longitudinal displacement range during change of a distance between said two supports (7).

3. A harvesting device in accordance with claim 1, wherein said second longitudinal end (20b) of said connection piece (20) means has a bolt (22) fixed thereon, which slidably extends through a bracket (23) fastened on said second of said two supports, and that a pressure spring (25) is disposed around said bolt (22), which is supported on said bracket (23) and on a nut (24) placed on said bolt (22).

4. A harvesting device in accordance with claim 4, wherein an electrical switch (26), such as a proximity switch, is disposed between said bracket (23) and said second longitudinal end (20b) of said connection piece (20) means, which switches off a drive of said picking roller (4) and/or a drive of said combine in case of an extreme change in a distance between said picking roller (4) and said bracing support (5, 6), as well as in case of a displacement, which exceeds a tolerance range, of said connection piece (20) means by an action of foreign bodies.

5. A harvesting device in accordance with claim 4, wherein said electrical switch (26) switches off said counter roller when the said drive of said picking roller is switched off.

6. A harvesting device in accordance with claim 1, wherein said bracing support (5, 6) is embodied as a cheek like guide plate partially enshrouding said picking roller, and wherein said connection piece (20) means extends into a cutout (11) of said picking roller (4) and surrounds said picking roller over a portion of a circle from a upwardly extending jam protector (28) to a cutter edge (21), which extends between said guide plate (6) and said picking roller (4) approximately horizontally in a gap (31).

7. The harvesting device in accordance with claim 1, wherein said bracing support (5, 6) is embodied as a driven counter-roller and a worm thread (18, 19) is engaged to said picking roller (4) and said counter roller (5) in said plant intake (PE).

8. The harvesting device in accordance with claim 7, wherein an edge (21) of said connection piece (20) means corresponds to a circumference of said worm thread (18, 19).

9. A harvesting device in accordance with claim 7, wherein said connection piece (20) means is disposed behind said worm thread (18, 19) attached in said plant intake (PE) on said picking roller (4) and said counter roller (5) and extends into a cutout (11) of said picking roller (4) and a space (14) of said counter roller (5).

10. A harvesting device in accordance with claim 7, wherein said plate-shaped connection piece (20) means encloses said picking roller (4) over a portion of an area of a circumference of said picking roller and has, between said picking roller (4) and said counter roller (5), an upwardly extending plate section (27) with a cutter edge (21), and between said picking roller (4) and said second of said two supports has an upwardly extending plate section (28) as a protection against jamming of pieces of chaff, and that a lower edge (29) of said connection piece (20) means lies in the area of said picking roller (4) within an envelope radius (R2) of said picking roller, and said connection piece (20) means extends downwardly in an area of said counter roller (5).

11. A harvesting device in accordance with claim 10, wherein said plate-shaped connection piece (20) means has a replaceable cutter blade (30) as a cutter edge at said upwardly extending plate section (27) between said picking roller (5) and said bracing support (5, 6).

12. A harvesting device in accordance with claim 11, wherein said plate-shaped connection piece (20) means is located below said worm thread (18, 19) on said picking roller (4) and said counter-roller (5), said edge (21a) extending over an entire top of said connection piece (20) means between said two supports (7), said edge (21a) being formed out in a direction counter to said plant intake (PE) and encloses said picking roller (4) and said counter-roller (5) in a curved shape over a portion of a circumference and which forms a cutter edge on said upwardly extending plate section (27) located between said picking roller (4) and said counter-roller (5) in an area of said picking roller (4) and said worm gear (18) in an area "S".

13. A harvesting device in accordance with claim 12, wherein said connection piece (20) means has said upwardly extending plate section (28) as jam protection at said second longitudinal end (20b), and a lower edge of said plate (29) extends at a distance below said picking roller (4) and said counter roller (5) in a horizontal direction from said picking roller (4) to said first longitudinal end (20a).

* * * * *